P. W. LITCHFIELD.
VULCANIZING MOLD.
APPLICATION FILED MAY 22, 1909.
944,339.
Patented Dec. 28, 1909.
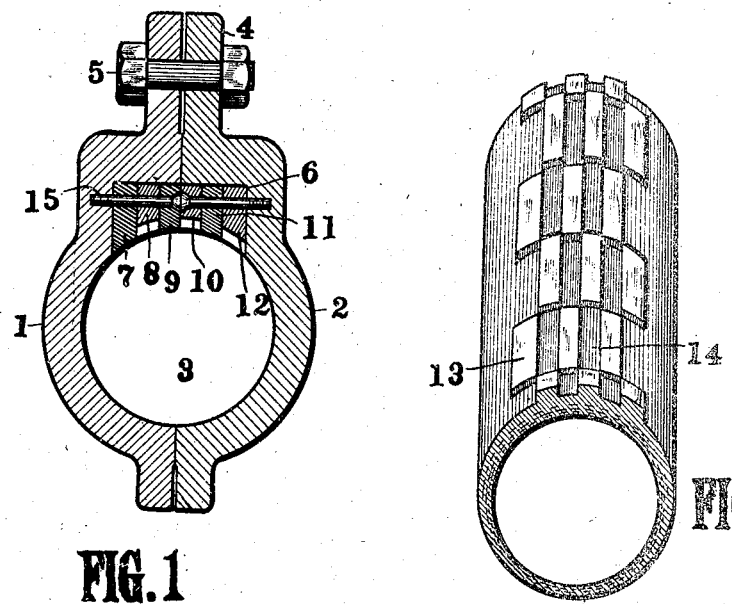
FIG.1
FIG.2
FIG.3
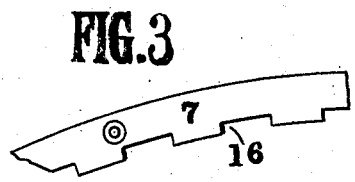
FIG.4
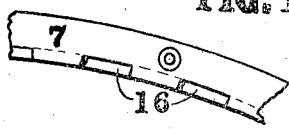
FIG.5
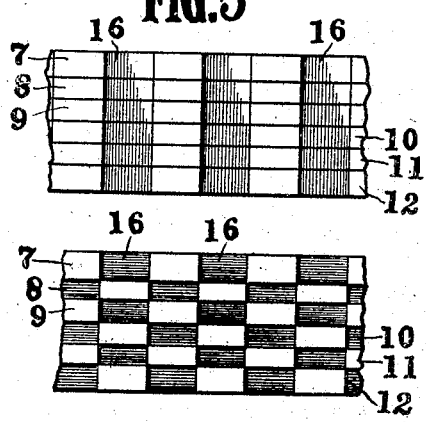
FIG.6
WITNESSES
Glenara Fox
Kathryn Brenneman
INVENTOR
Paul W. Litchfield
by C. E. Humphrey
ATTORNEY though the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures: Figure 1 is a cross sectional view of a tire mold embodying this invention. Fig. 2 is a view of a tire which has been formed in a mold such as shown in Fig. 1 and used to illustrate the operation of the same. Fig. 3 is a view in side elevation of a ring employed in connection with this invention. Fig. 4 is a view similar to Fig. 3 of a plurality of rings in alinement with each other with the notches of one ring alternating with respect to the notches of adjacent rings. Fig. 5 is an inverted plan of a plurality of rings such as shown in Fig. 3 with the notches therein in transverse alinement; and, Fig. 6 is a view similar to Fig. 5 with the notches in each ring alternating with respect to the notches of adjacent rings.

UNITED STATES PATENT OFFICE.

PAUL W. LITCHFIELD, OF AKRON, OHIO, ASSIGNOR TO THE GOODYEAR TIRE AND RUBBER COMPANY, OF AKRON, OHIO, A CORPORATION OF OHIO.

VULCANIZING-MOLD.

944,339.  Specification of Letters Patent.  Patented Dec. 28, 1909.

Application filed May 22, 1909. Serial No. 497,683.

*To all whom it may concern:*

Be it known that I, PAUL W. LITCHFIELD, a citizen of the United States, residing at Akron, in the county of Summit and State of Ohio, have invented new and useful Improvements in Vulcanizing-Molds, of which the following is a specification.

This invention relates to molds for vulcanizing elastic articles such as vehicle tires. Heretofore in the manufacture of vehicle tires, either of the solid or pneumatic type, when it was sought to provide the tread of the tire with a peculiar design, the result was accomplished by cutting or forming the design in the metal of the wall of the mold. This was usually easily accomplished by the use of a suitable machine where the design to be produced upon the tire was formed upon curvilinear lines, but if on the contrary, the design was angular in conformation, the forming of the design in the metal of the mold was exceedingly difficult and very expensive. Experience has also shown that where protuberances are to be formed on the outer surface of the tire the corresponding recesses in the mold must each be provided with a suitable vent to permit the escape of air to allow the recesses to properly fill with the tire material, thus necessitating a separate vent for each of the recesses in order to obtain satisfactory results from the same.

In view of the objections existing to the foregoing method of manufacturing molds, the object of this invention, broadly speaking, is to provide a mold for the vulcanizing of elastic vehicle tires having a removable portion, upon the inner surface of which any selected design may be easily formed when the portion is detached from the mold and when inserted therein and constituting a portion thereof produces in the finished tire the desired design.

The invention also contemplates making the removable section of the mold of a plurality of separate rings, the inner faces of each of which are arranged to constitute a portion of the inner mold surface and each of which may be separately subjected to a tool for producing the desired design therein. By forming this detachable portion of a plurality of rings, the inner surface of each of the rings will constitute a portion of the complete design to be imparted to the surface of the tire and when assembled and mounted in the mold the complete design will be formed on the tire.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Referring to the drawings in detail, the reference numerals 1 and 2 denote mold sections, preferably of the general type shown, having in their inner oppositely-disposed faces semi-circular grooves, which when the molds are united constitute a mold cavity 3. The mold members are provided at intervals with laterally-projecting registering apertured lugs 4 through which extend bolts 5 for clamping them together. The inner faces of the mold members 1 and 2 are also provided with circumferentially-extending rabbets, which together form a circumferentially-extending recess 6. This recess is in open communication with the mold cavity 3 and is preferably placed on the outer portion thereof so as to be opposite the tread of the tire placed in the cavity 3. Mounted in the recess 6 are a plurality of rings, designated in the drawings by the reference numerals 7, 8, 9, 10, 11 and 12 which are used to illustrate this invention, but it will be understood that the number of rings may be increased or diminished as desired and still be within the scope of this invention, the number of rings employed being governed largely by the peculiar nature of the design which it is sought to produce on the tread portion of the tire.

The design which the rings shown in the drawings are capable of producing consists in a plurality of protuberances 13 alternating in position with recesses 14 the protuberances and recesses being arranged in both longitudinal and transverse alternating series so that the protuberances of one circumferential series alternate transversely with the recesses of the adjacent longitudinal series and the recesses of each longitudinal series also alternate transversely with the corresponding protuberances of adjacent series.

In constructing the mold, one half of the rings are placed in the rabbet in one mold member and the other half of the rings in the rabbet in the other mold cavity and are severally held in position through the medium of holdfast devices 15. Each mold member is then placed in a suitable machine and the semi-circular grooves which form the mold cavity 3 are accurately turned, during which operation the inner faces of the rings are also shaped to conform to the general outline of the cavity 3. The rings are then removed and are clamped together in transverse registering relation in a suitable machine and a plurality of transverse grooves 16 are cut therein, as shown in Fig. 5, after which the rings are placed in their respective rabbets in the mold members, during which operation the recesses or grooves in adjacent rings will be arranged in staggered relation with each other, as shown in Fig. 6. The rings are secured in place by the holdfast devices 15. An unvulcanized tire is then placed in the cavity 3 and the mold members clamped together by the bolts 5 and the mold with its contents subjected to a vulcanizing heat, during which the tire material expands sufficiently to fill the recesses 16 in the rings, and the design formed on the rings is imparted to the tread of the tire, as clearly shown in Fig. 2.

Experience has shown that there is sufficient leakage of air outwardly both between the rings and the walls of the rabbets in which they are mounted to permit the material of the tire to freely expand into the recesses 16, thus avoiding any danger of trouble in the formation of a perfect design in the finished product corresponding to the design formed on the inner faces of the rings. It will be obvious that other designs may be cut on the interior of the rings and the number of rings may be varied accordingly and still be within the scope of this invention. It will also be apparent that when the rings are removed from their seat in the rabbets which form the recesses 6 a suitable machine tool may be applied to their inner faces for cutting or forming the desired design therein.

What I claim and desire to secure by Letters Patent, is:—

1. A vulcanizing mold comprising complementary members having registering grooves in their abutting faces forming a mold cavity, each of said members provided with a recess communicating with said cavity and a plurality of rings mounted in said recesses, the inner faces thereof being recessed, the recesses in each ring alternating in position with respect to the recesses in the adjoining rings, the inner faces of said rings adapted to constitute a portion of the outer wall of said mold cavity and receive the outer surface of an article vulcanized therein for producing on the outer surface thereof the design formed on the inner faces of said rings.

2. A vulcanizing mold comprising an annular body formed with a mold cavity and furthermore provided with a circumferentially-extending recess opening into said cavity, a plurality of rings mounted in said recess and each provided in the edge thereof which opposes the mold cavity with a series of spaced recesses, the recesses of one ring being alternately disposed with respect to the recesses of the other ring.

3. A vulcanizing mold comprising an annular body formed with a mold cavity and furthermore provided with a circumferentially-extending recess opening into said cavity, a plurality of rings mounted in said recess and each provided in the edge thereof which opposes the mold cavity with a series of spaced recesses, the recesses of one ring being alternately disposed with respect to the recesses of the other ring, each of said rings having that edge which opposes the mold cavity segment-shaped in cross-section and each of said rings having the inner wall of each of its recesses segment-shaped in cross-section, said rings having the edges which oppose the mold cavity flush with each other.

4. A vulcanizing mold comprising an annular body formed with a mold cavity and furthermore provided with a circumferentially-extending recess opening into said cavity, a plurality of rings mounted in said recess and each provided in the edge thereof which opposes the mold cavity with a series of spaced recesses, the recesses of one ring being alternately disposed with respect to the recesses of the other ring, and transversely-extending means for securing the rings to said body.

5. A vulcanizing mold comprising an annular body formed with a mold cavity and furthermore provided with a circumferentially-extending recess opening into said cavity, a series of rings mounted in said recess and each provided in the edge thereof which opposes the mold cavity with a series of spaced recesses, the recesses of one ring being alternately disposed with respect to the recesses of the other ring, the outer rings of the series being thicker than the intermediate rings.

6. A collapsible mold comprising an annular body provided with a series of annular members arranged within said body and each having a working edge provided with a circumferentially-extending series of recesses, the recesses of one member alternately-disposed with respect to the recesses of the other member.

7. A collapsible mold comprising an annular body provided with a series of annular members arranged within said body and each having a working edge provided with a circumferentially-extending series of recesses, the recesses of one member alternately-disposed with respect to the recesses of the other member, and means extending transversely with respect to said body for fixedly securing said members in position.

8. A vulcanizing apparatus comprising a body portion provided with a plurality of annular members each having a working face provided with recesses, the recesses of one member alternately-disposed with respect to the recesses of the other member whereby the un-recessed portions of adjacent members will constitute side walls of the recesses of the other members.

9. A vulcanizing mold comprising coöperating separable sections adapted to be detachably connected and having annular grooves adapted to register to provide a mold cavity, each of said sections furthermore provided with an annular recess opening into the groove of its respective section, and a plurality of recessed rings removably mounted in each of said recesses, the recessed portions of said rings opposing said mold cavity, the recesses of one ring being alternately disposed with respect to the recesses of an adjacent ring.

In testimony whereof I have hereunto set my hand in presence of two subscribing witnesses.

PAUL W. LITCHFIELD.

Witnesses:
C. E. HUMPHREY,
GLENARA FOX.